(12) United States Patent
Usui

(10) Patent No.: US 10,381,911 B2
(45) Date of Patent: Aug. 13, 2019

(54) LINEAR MOTOR, MAGNET UNIT, AND STAGE DEVICE

(71) Applicant: SUMITOMO HEAVY INDUSTRIES, LTD., Tokyo (JP)

(72) Inventor: Doutaro Usui, Yokosuka (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 112 days.

(21) Appl. No.: 15/043,948

(22) Filed: Feb. 15, 2016

(65) Prior Publication Data

US 2016/0241120 A1    Aug. 18, 2016

(30) Foreign Application Priority Data

Feb. 17, 2015 (JP) ................................. 2015-028193

(51) Int. Cl.
*H02K 41/03* (2006.01)
*H02K 1/17* (2006.01)

(52) U.S. Cl.
CPC ............. *H02K 41/031* (2013.01); *H02K 1/17* (2013.01); *H02K 2213/03* (2013.01)

(58) Field of Classification Search
CPC ......................................... H02K 41/00–41/065
USPC ............................................ 310/12.01–12.33
See application file for complete search history.

(56) References Cited

U.S. PATENT DOCUMENTS

| 6,104,108 A | * | 8/2000 | Hazelton | G03F 7/70758 |
| | | | | 310/12.06 |
| 2014/0285122 A1 | * | 9/2014 | Lu | H02K 21/24 |
| | | | | 318/135 |
| 2015/0137624 A1 | * | 5/2015 | Wu | H02K 41/031 |
| | | | | 310/12.05 |
| 2016/0111948 A1 | * | 4/2016 | Sun | H02K 41/031 |
| | | | | 310/12.21 |

FOREIGN PATENT DOCUMENTS

| JP | WO 2006035835 A1 | * | 4/2006 | ......... G03F 7/70758 |
| JP | 2009106037 A | * | 5/2009 | |
| JP | 2010-050440 A | | 3/2010 | |
| JP | 2010-063201 A | | 3/2010 | |
| JP | 2010063201 A | * | 3/2010 | |
| JP | 2010-104136 A | | 5/2010 | |
| JP | 2013-106458 A | | 5/2013 | |
| WO | 2006-035835 A1 | | 4/2006 | |
| WO | WO 2014019438 A1 | * | 2/2014 | ........... H02K 41/031 |

OTHER PUBLICATIONS

Machine Translation, Totsu, WO 2006035835 A1, Apr. 2006.*
Machine Translation, Ohashi, JP 2009106037 A, May 2009.*
Machine Translation, Nakayama, JP-2010063201-A, Mar. 2010. (Year: 2010).*

* cited by examiner

*Primary Examiner* — Thomas Truong
(74) *Attorney, Agent, or Firm* — Hea Law PLLC

(57) ABSTRACT

A linear motor includes a movable element and a stator. The stator includes a pair of back yokes provided opposing each other such as to flank the movable element along a direction perpendicular to the movable element's axis of travel, a (Continued)

plurality of main pole magnets provided spaced apart from each other and paralleling the axis of travel, on respective inside lateral surfaces of the pair of back yokes, and first and second interpole magnets provided, adjoining along said axis of travel, in each of intervals between adjoining couples of the main pole magnets.

6 Claims, 4 Drawing Sheets

LINEAR MOTOR, MAGNET UNIT, AND STAGE DEVICE

RELATED APPLICATIONS

Priority is claimed to Japanese Patent Application No. 2015-028193, filed Feb. 17, 2015, the entire content of which is incorporated herein by reference.

BACKGROUND

Technical Field

Certain embodiments of the invention relate to linear motors.

Description of Related Art

A linear motor is used to convert electrical energy into linear motion. FIG. 1 is a perspective view of a linear motor in the related art. FIG. 2 is a plan view showing the arrangement of field magnets of the linear motor in the related art.

A linear motor 2r as represented in FIG. 1 is furnished with a movable element 10 and a stator 20r. The stator 20r is furnished with a pair of yokes (back yokes) 22a and 22b disposed in opposition with the movable element 10 interposed between them, and pluralities of field magnets 24 provided along the way that the movable element 10 travels (along the x-axis) on respective inside lateral surfaces S1a and S1b of the back yokes 22a and 22b.

As shown in FIG. 2, the pluralities of field magnets 24 include main pole magnets 24a and interpole magnets 24b. The main pole magnets $24a_1$, $24a_2$, $24a_3$ ... are bonded in place according to a magnetic pole pitch and such that the N poles and S poles appear in alternation. Interpole magnets $24b_i$, which have magnetic poles oriented along the magnetic field generated by two adjoining main pole magnets $24a_i$ and $24a_{i+1}$, are provided in between the adjoining main pole magnet pairs. (Here, i=1, 2, 3 .....) The configuration of such a magnetic circuit is called a Halbach array, employed in various linear motors.

SUMMARY

In one aspect the present invention affords a linear motor. The linear motor includes a movable element and a stator. The stator includes a pair of back yokes provided opposing each other such as to flank the movable element along a direction perpendicular to the movable element's axis of travel, a plurality of main pole magnets provided spaced apart from each other and paralleling the axis of travel, on respective inside lateral surfaces of the pair of back yokes, and first and second interpole magnets provided, adjoining along said axis of travel, in each of intervals between adjoining couples of the main pole magnets.

In another aspect, the present invention affords a stage device. The stage device includes a linear motor as set forth above.

In still another aspect, the present invention affords a magnet unit. The magnet unit is used in a linear motor that includes a movable element and a stator. The stator includes a pair of back yokes provided opposing each other such as to flank the movable element along a direction perpendicular the movable element's axis of travel, and pluralities of magnet units disposed paralleling said axis of travel on respective inside lateral surfaces of the pair of back yokes. The magnet unit includes main pole magnets and interpole magnets snugly affixed to either of ends of the main pole magnets.

DETAILED DESCRIPTION

Figure 1:
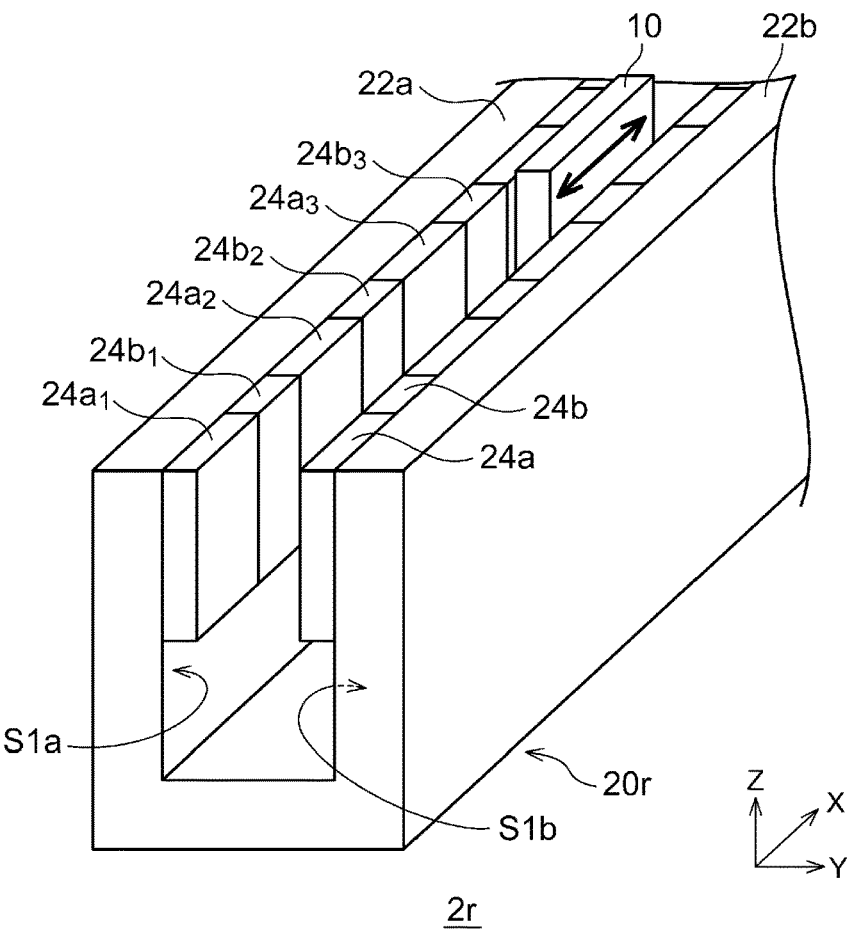
FIG. 1 is a perspective view of a linear motor in the related art.
Figure 2:
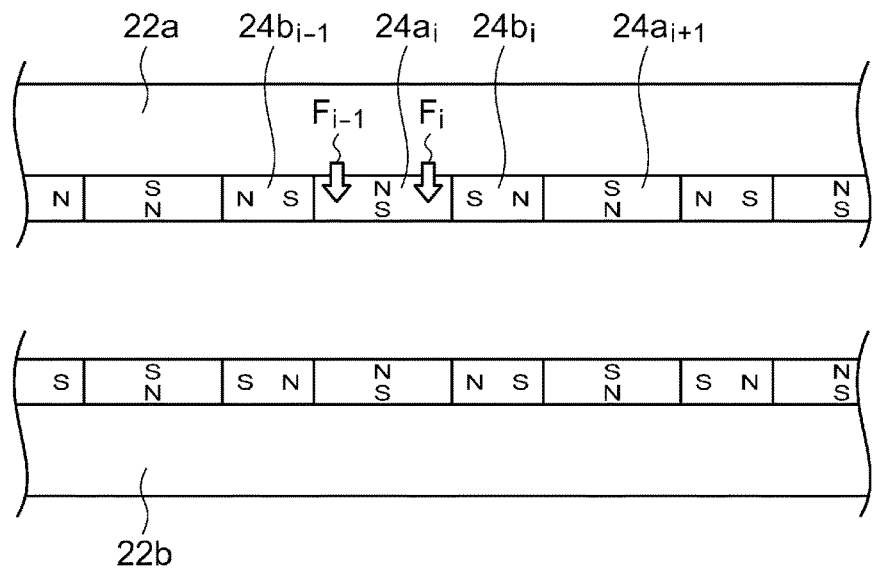
FIG. 2 is a plan view showing the arrangement of field magnets of the linear motor in the related art.

The inventor has found out the following problems as a result of the examination of the Halbach array of FIG. 2. In a magnetic circuit that does not include the interpole magnet 24b, a magnetic field generated by the main pole magnet 24a passes through the yoke 22. However, in the Halbach array structure including the interpole magnet 24b, the interpole magnets 24b serves as an alternative magnetic path, that is, a magnetic field generated by the main pole magnet 24a passes through the interpole magnet 24b.

Attention is paid to the $i^{th}$ main pole magnet $24a_i$. The N pole of the main pole magnet $24a_i$ and the S pole of an interpole magnet $24b_i$, which is adjacent to the main pole magnet $24a_i$, generate an attractive force $F_i$. Likewise, the N pole of the main pole magnet $24a_i$ and the S pole of an interpole magnet $24b_{i-1}$, which is adjacent to the main pole magnet $24a_i$, also generate an attractive force $F_{i-1}$. Since the other main pole magnets 24a are also the same as described above, a force is applied in a direction, in which the main pole magnet 24a is separated from the yoke 22, by the interpole magnet 24b.

In order to resist a force F that separates the main pole magnet 24a from the yoke 22, the main pole magnet 24a needs to be bonded to the yoke 22 by a strong adhesive, or the side surface of the main pole magnet 24a and the interpole magnet 24b need to be bonded to each other. For this reason, an assembling step may be complicated.

Further, even though such a countermeasure is prepared, bonding strength varies due to the dimensional variations and the non-flatness of the main pole magnets 24a or the interpole magnets 24b. For this reason, it is difficult to completely prevent some of the field magnets 24 from being separated from the yoke 22.

The invention provides a linear motor of which reliability is high in an assembling step and/or after assembly.

In this aspect, one interpole magnet, which has been provided between adjacent main pole magnets in the Halbach array in the related art, is divided into two magnets. Accordingly, it is possible to inhibit a force, which separates a certain main pole magnet from the back yoke, from being generated so as to be concentrated on the main pole magnet in an assembling step. Eventually, it is possible to improve reliability in the assembling step and/or after assembly.

When a magnetic pole pitch is denoted by Wp, a width Wa of the main pole magnet, a width Wc of the first interpole magnet, and a width Wd of the second interpole magnet may satisfy $$Wa+Wc+Wd=Wp,$$

$$0.5 \times Wp \leq Wa \leq 0.9 \times Wp, \text{ and}$$

$$0.1 \times Wp \leq Wc+Wd \leq 0.5 \times Wp.$$

Wc may be equal to Wd.

The main pole magnet and two interpole magnets, which are provided on both ends of the main pole magnet, may be integrated as a magnet unit and may then be bonded to the back yoke.

Since every magnet unit is bonded to the back yoke, an attractive force acts between the back yoke and the magnet unit as a whole, and a force, which separates the main pole magnet from the yoke, can be reduced. Further, since an attractive force acts between adjacent magnet units, the assembling of the stator becomes easy.

Meanwhile, arbitrary combinations of the above-mentioned components, and aspects in which the components or expressions of the invention are replaced between methods, devices, systems, and the like are also effective as aspects of the invention.

According to the invention, it is possible to improve the reliability of the linear motor in an assembling step and/or after assembly.

The invention will be described below on the basis of a preferred embodiment thereof with reference to the drawings. Hereinafter, the same or equivalent components, members, and processing, which are shown in the respective drawings, are denoted by the same reference numerals, and the repeated description thereof will be appropriately omitted. Further, the embodiment is illustrative without limiting the invention, and all characteristics, which are described in the embodiment, or the combinations thereof do not necessarily need to be essential in the invention.

Figure 3:
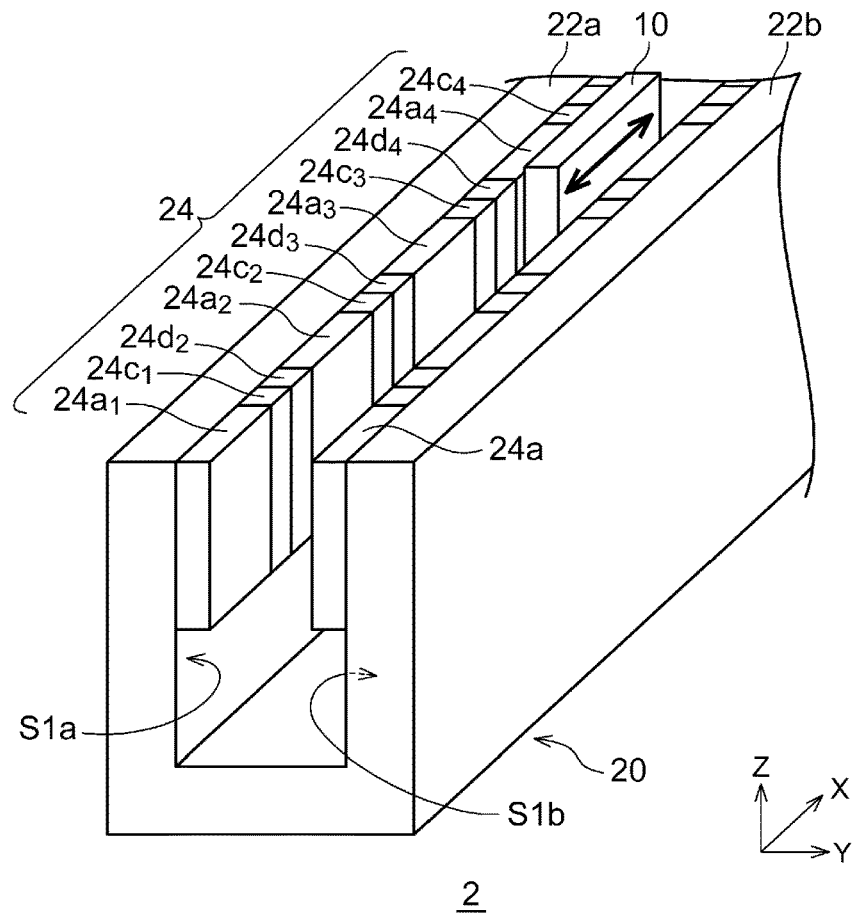
FIG. 3 is a perspective view of a linear motor according to an embodiment.
Figure 4:
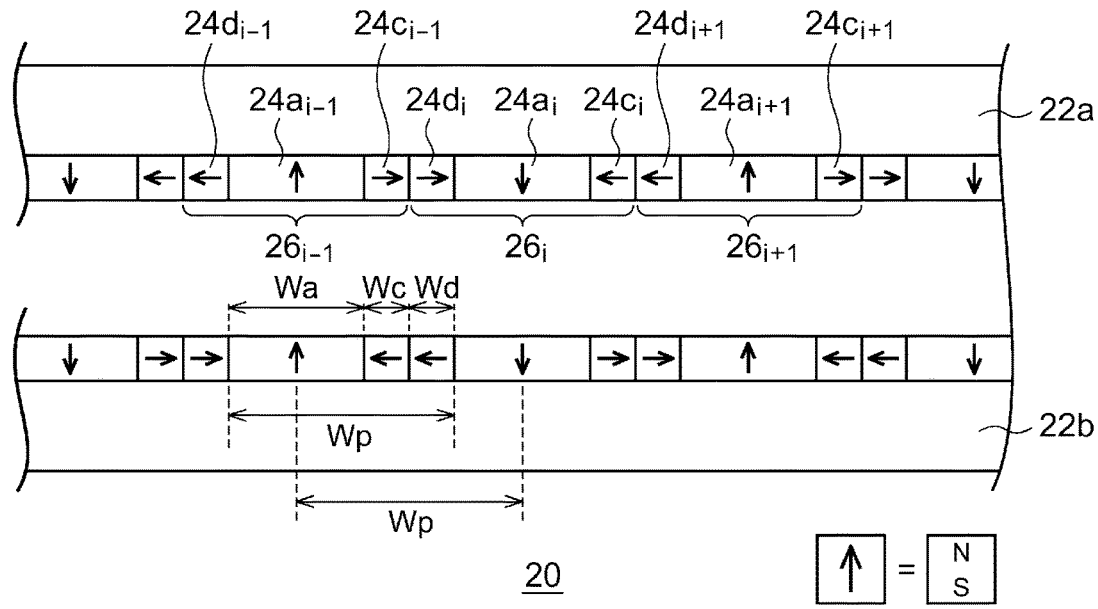
FIG. 4 is a plan view showing the arrangement of field magnets of FIG. 3.

FIG. 3 is a perspective view of a linear motor 2 according to an embodiment. FIG. 4 is a plan view showing the arrangement of field magnets of FIG. 3. In the drawings, arrows indicate the orientations of magnetic poles, the tip of the arrow corresponds to an N pole, and the base of the arrow corresponds to an S pole.

As shown in FIG. 3, the linear motor 2 includes a movable element 10 and a stator 20. The stator 20 includes a pair of back yokes (simply referred to as yokes) 22a and 22b and a plurality of field magnets 24. The pair of yokes 22a and 22b are provided so as to face each other with the movable element 10 interposed therebetween in a direction (y direction) perpendicular to a movable direction of the movable element 10 (x direction).

The plurality of field magnets 24 include a plurality of main pole magnets 24a and a plurality of interpole magnets 24c and 24d. The plurality of main pole magnets $24a_1$, $24a_2$, $24a_3$ . . . are provided along the movable direction (the x direction) on inner surfaces S1a and S1b of the pair of back yokes 22a and 22b.

As shown in FIG. 4, two interpole magnets 24c and 24d are provided between two adjacent main pole magnets 24a so as to be adjacent to each other in the movable direction (the x direction). Specifically, a first interpole magnet $24c_i$ and a second interpole magnet $24d_{i+1}$ are inserted between the $i^{th}$ main pole magnet $24a_i$ and the $(i+1)^{th}$ main pole magnet $24a_{i+1}$ so as to be adjacent to each other.

The width Wc of the first interpole magnet $24c_{i+1}$ and the width Wd of the second interpole magnet $24d_i$ may be designed so that the sum of the width Wc of the first interpole magnet $24c_{i+1}$ and the width Wd of the second interpole magnet $24d_i$ is substantially equal to the width of the interpole magnet 24b of a magnetic circuit having the Halbach array structure in the related art.

When a distance between the centers of adjacent main pole magnets 24a is defined as a magnetic pole pitch Wp, it is preferable that the width Wa of the main pole magnet 24a satisfies Wa≥0.5×Wp. In this case, the sum Wc+Wd of the widths of the two interpole magnets 24c and 24d satisfies Wc+Wd≤0.5×Wp≤Wa. Meanwhile, in order to obtain the effects of the interpole magnets 24c and 24d, it is preferable that the sum Wc+Wd of the widths of the interpole magnets 24c and 24d is larger than 1/10 of the magnetic pole pitch Wp.

Considering these conditions, the widths of the main pole magnet 24a and the interpole magnets 24c and 24d may be determined so as to satisfy the following expressions.

$$Wa+Wc+Wd=Wp$$

$$0.5 \times Wp \leq Wa \leq 0.9 \times Wp$$

$$1.0 \times Wp \leq Wc+Wd \leq 0.5 \times Wp$$

Wc=Wd may also be satisfied in terms of the simplification of design and manufacture.

Figure 5A:
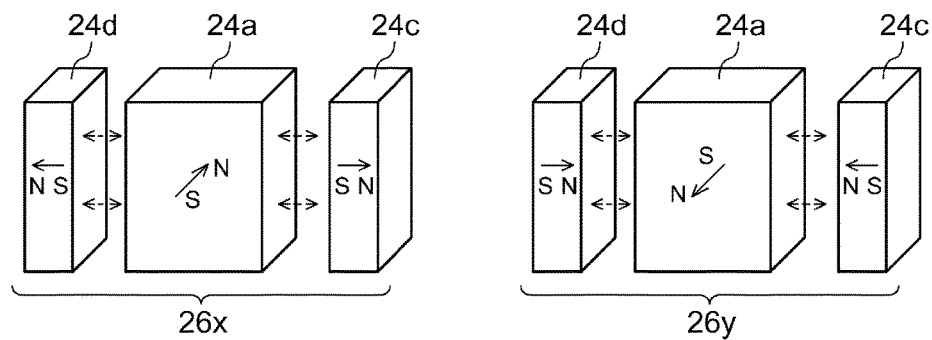
FIGS. 5A to 5C are views showing steps of manufacturing a stator.
Figure 5B:
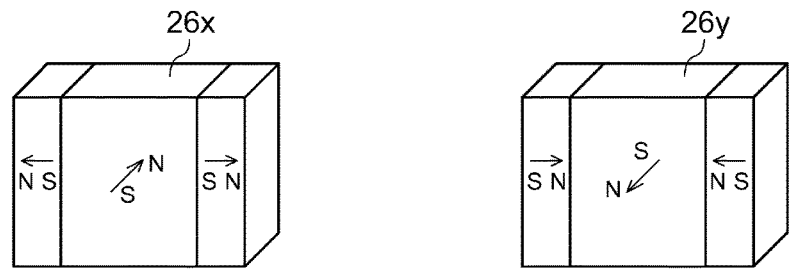
Figure 5C:
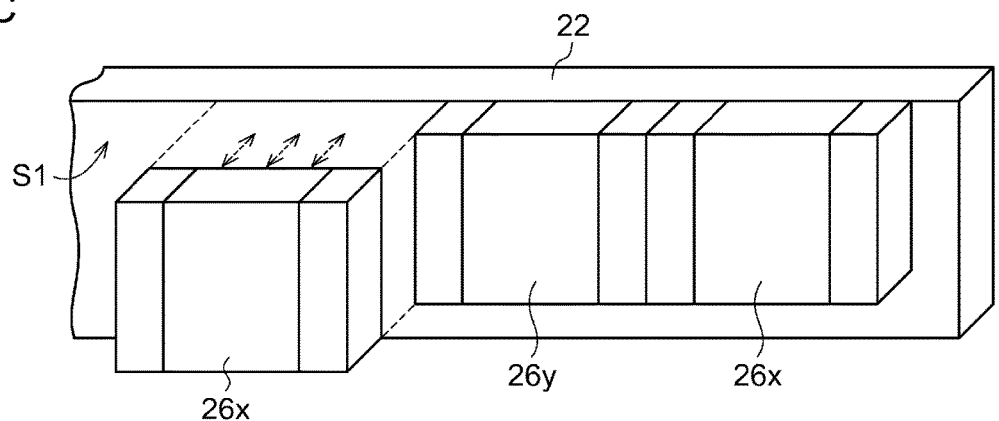

The structure, which has been described until now, is the structure of the stator 20. Subsequently, a method of manufacturing the stator 20 will be described. After the $i^{th}$ main pole magnet $24a_i$ and the first and second interpole magnets $24c_i$ and $24d_i$, which are provided on both ends of the $i^{th}$ main pole magnet $24a_i$, are integrated as a magnet unit $26_i$, the stator 20 can be assembled while the magnet unit $26_i$ is used as a unit. As shown in FIG. 5A to 5C, the directions of the interpole magnets 24c and 24d of an even-numbered magnet unit are opposite to those of an odd-numbered magnet unit. Accordingly, two kinds of magnet units 26x and 26y are prepared.

FIGS. 5A to 5C are views showing steps of manufacturing the stator 20.

The second interpole magnet 24d and the first interpole magnet 24c are fixed to both side surfaces of the main pole magnet 24a by an adhesive as shown in FIG. 5A, so that two kinds of magnet units 26x and 26y are formed as shown in FIG. 5B. Then, the magnet units 26x and 26y are alternately bonded to a surface S1 of the yoke 22 by an adhesive. An adhesive may also be applied between the adjacent magnet units 26x and 26y. The method, which has been described until now, is the method of manufacturing the stator 20.

Subsequently, the advantages of the linear motor 2 according to the embodiment will be described. One interpole magnet, which has been provided between the adjacent main pole magnets in the Halbach array in the related art, is divided into two magnets in this embodiment.

Accordingly, when the plurality of field magnets 24, specifically, the plurality of main pole magnets 24a, the plurality of first interpole magnets 24c, and the plurality of second interpole magnets 24d are bonded to the yoke 22, the field magnets can be assembled in an order that is not mentioned in the Halbach array in the related art. Accordingly, it is possible to inhibit a force, which separates the main pole magnet 24a from the back yoke 22, from being generated so as to be concentrated on the main pole magnet 24a. In other words, the field magnets 24 can be bonded to the yoke 22 in an order where the separation of the main pole magnet 24a from the back yoke 22 is suppressed. Accordingly, it is possible to improve reliability in an assembling step and/or after assembly.

Specifically, in the embodiment, particularly, every magnet unit 26 is bonded to the yoke 22 as shown in FIGS. 5A to 5C. Accordingly, a force, which attracts the back yoke 22, acts on the magnet unit 26 as a whole, and a force, which separates the main pole magnet 24a from the yoke 22, is reduced. In addition, an attractive force acts between the adjacent magnet units 26. Accordingly, work for bonding the plurality of field magnets 24 to the yoke 22 becomes easy, so that the assembling of the stator 20 becomes easy.

The advantages, which have been described until now, are the advantages of the linear motor 2. Subsequently, the use of the linear motor 2 will be described.

Figure 6:
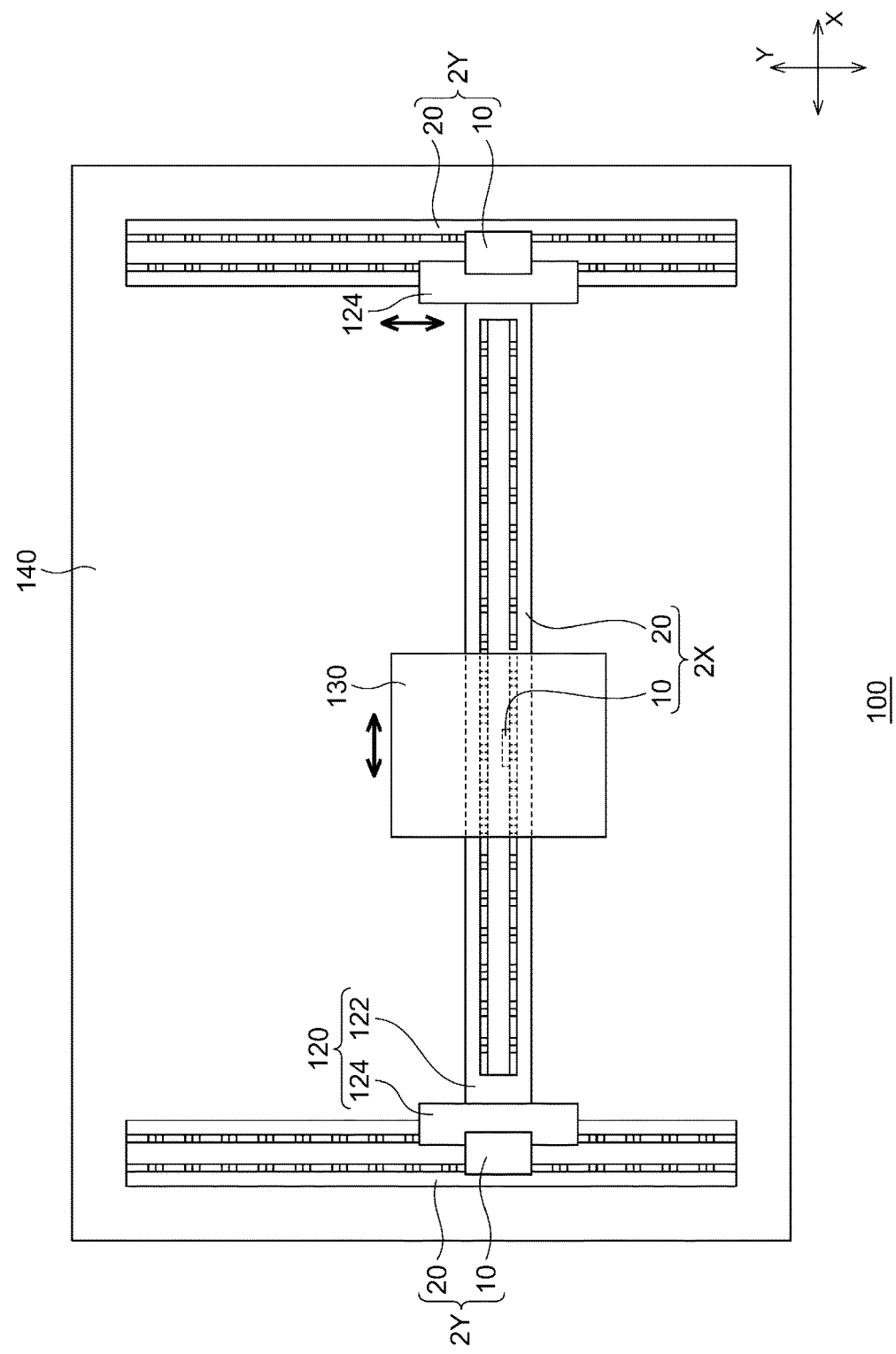
FIG. 6 is a plan view of a stage device that uses the linear motor according to the embodiment.

FIG. 6 is a plan view of a stage device 100 that uses the linear motor 2 according to the embodiment. The stage device 100 is called an XY stage, and positions an object in the x direction and the y direction.

The stage device 100 mainly includes a Y stage 120, an X stage 130, and a surface plate 140.

The Y stage 120 includes a pair of sliders 124 and a horizontal member 122 that is horizontally provided between the pair of sliders 124. An X linear motor 2X, which moves the X stage 130 in the x direction, is provided on the horizontal member 122. The X linear motor 2X includes the stator 20 that is fixed to the horizontal member 122 and extends in the x direction, and the movable element (coil) 10 that is provided on the lower surface of the X stage 130. Accordingly, the X stage 130 is positioned in the x direction by the control of the movable element 10 of the X linear motor 2X.

A pair of Y linear motors 2Y are provided on both ends of the surface plate 140. Each of the Y linear motors 2Y includes the movable element 10 and the stator 20. The above-mentioned sliders 124 are fixed to the stators 20 of the Y linear motors 2Y. The Y stage 120 is positioned in they direction by the control of the movable elements 10 of the Y linear motors 2Y.

The structure, which has been described until now, is the structure of the stage device 100. The linear motor 2 according to the embodiment can be suitably used as the X linear motor 2X or the Y linear motor 2Y of the stage device 100. The stage device 100 can be used to position a wafer or a glass substrate in an exposure apparatus, or can also be used for an actuator, which is used in a scanning electron microscope (SEM), or the like.

The invention has been described above on the basis of the embodiment. The embodiment is illustrative, and it is understood by those skilled in the art that combinations of the respective components or various kinds of processing of the embodiment can have various modifications and the modifications are also included in the scope of the invention. These modifications will be described below.

Modification 1

In the embodiment, as shown in FIGS. 5A to 5C, the main pole magnet 24a and the first and second interpole magnets 24c and 24d, which are provided on both ends of the main pole magnet 24a, have been integrated as one magnet unit 26 and the magnet unit then has been bonded to the yoke 22. However, the invention is not limited thereto. For example, the magnet unit 26x and the magnet unit 26y may be bonded to each other to form one magnet unit, and may be bonded to the yoke 22 while the magnet unit is used as a unit.

Modification 2

Alternatively, after the plurality of main pole magnets 24a are bonded to the stator 20 at predetermined intervals in a horizontal direction, the first interpole magnets 24c and the second interpole magnets 24d may be bonded so as to fill the intervals. That is, an order in which the field magnets 24 are bonded to the yoke 22 is not particularly limited, and the field magnets 24 may be assembled in an arbitrary order as long as the separation of the field magnets 24 from the yoke 22 is prevented.

Modification 3

A case in which each of the first and second interpole magnets 24c and 24d is magnetized in a direction perpendicular to the direction of the magnetic pole of the main pole magnet 24a has been described in the embodiment, but the invention is not limited thereto. The first and second interpole magnets 24c and 24d may be magnetized so as to have a gradient with respect to the direction perpendicular to the direction of the magnetic pole of the main pole magnet 24a.

Modification 4

A case in which the width Wc of the first interpole magnet 24c and the width Wd of the second interpole magnet 24d are equal to each other has been described in the embodiment, but the width Wc and the width Wd may be different from each other under a condition in which the magnetic pole pitch Wp is constant.

The invention has been described using specific words and phrases on the basis of the embodiment, but the embodiment merely shows the principle and application of the invention and allows various modifications and the changes of disposition without departing from the scope of the invention that is defined in claims.

What is claimed is:

1. A linear motor comprising:
a movable element movable along a travel axis; and
a stator, wherein the stator includes
a pair of back yokes provided opposing each other such as to flank the movable element along a direction perpendicular to the travel axis,
a plurality of main pole magnets each of travel-axis-directed width Wa, provided spaced apart from each other and paralleling said travel axis, on respective inside lateral surfaces of the pair of back yokes, and
first and second interpole magnets each being a rectangular single-piece solid having two opposing surfaces perpendicular to said travel axis and provided, travel-axis directedly adjoining each other, in each of intervals between adjoining couples of the main pole magnets, the first interpole magnets each being of travel-axis-directed width Wc and the second interpole magnets each being of travel-axis-directed width Wd, and the first and second interpole magnets respectively having constant magnetization in the same direction, paralleling said travel axis.

2. The linear motor according to claim 1, wherein letting Wp be travel-axis-directed magnetic pole pitch, then the widths Wa, Wc, and Wd of, respectively, the main pole, first interpole, and second interpole magnets satisfy $Wa+Wc+Wd=Wp$ $0.5 \times Wp \leq Wa \leq 0.9 \times Wp$ and $0.1 \times Wp \leq Wc+Wd \leq 0.5 \times Wp$.

3. The linear motor according to claim 1, wherein the main pole magnets, and couples of interpole magnets provided on either of ends of the main pole magnets, are integrally constituted and assembled onto the back yokes.

4. A stage device comprising the linear motor according to claim 1.

5. The linear motor according to claim 1, wherein one of the two opposing surfaces of each of the first interpole magnets and one of the two opposing surfaces of each of the second interpole magnets face against each other.

6. A linear motor comprising:
   a movable element movable along a travel axis; and
   a stator, wherein the stator includes
   a pair of back yokes provided opposing each other such as to flank the movable element along a direction perpendicular to the travel axis,
   a plurality of main pole magnets provided spaced apart from each other and paralleling said travel axis, on respective inside lateral surfaces of the pair of back yokes, and
   first and second interpole magnets each being a rectangular single-piece solid and provided, travel-axis directedly adjoining each other, in each of intervals between adjoining couples of the main pole magnets, wherein the first and second interpole magnets each have two opposing surfaces perpendicular to said travel axis, and one of the two opposing surfaces of each of the first interpole magnets and one of the two opposing surfaces of each of second interpole magnets face against each other.

* * * * *